(No Model.) 2 Sheets—Sheet 1.
W. W. DOOLITTLE.
ART OF MACHINING CASTINGS.
No. 587,477. Patented Aug. 3, 1897.
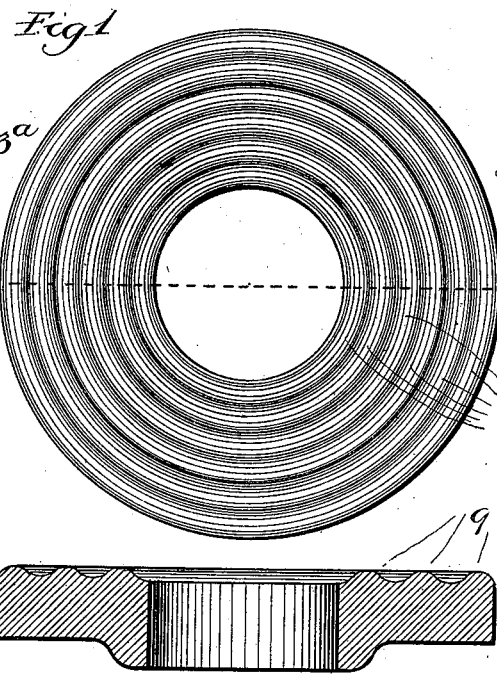
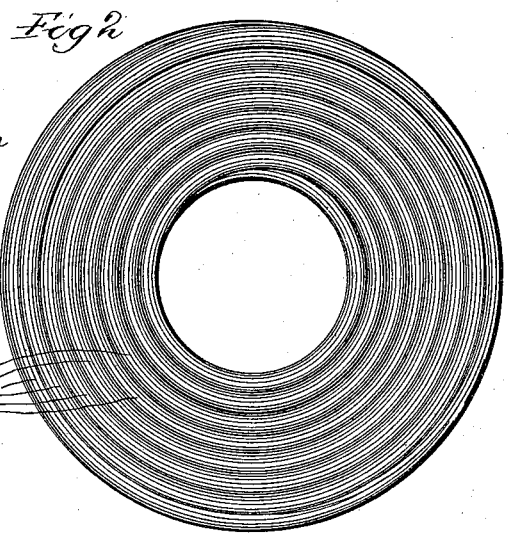
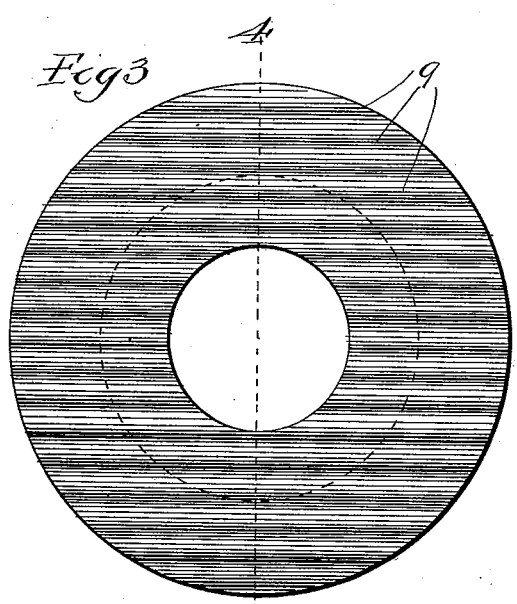
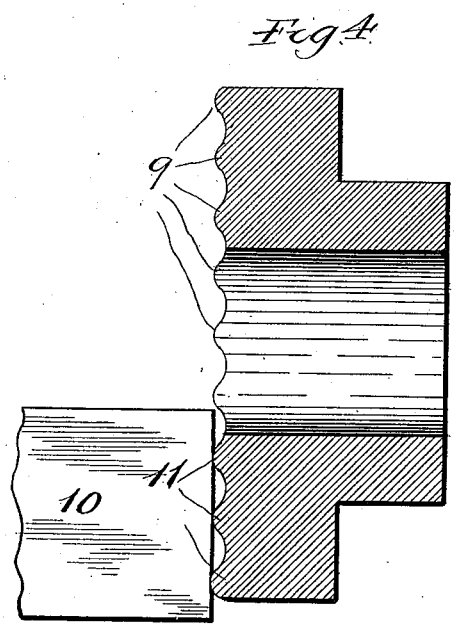
Witnesses
W. C. Coolies
C. H. Crawford
Inventor
William W. Doolittle
by Paul Synnestvedt
Atty
THE NORRIS PETERS CO., PHOTO-LITHO., WASHINGTON, D. C.

(No Model.) 2 Sheets—Sheet 2.
W. W. DOOLITTLE.
ART OF MACHINING CASTINGS.
No. 587,477. Patented Aug. 3, 1897.

Witnesses
W. C. Coolies
C. H. Crawford

Inventor
William W. Doolittle
by Paul Synnestvedt
Atty

UNITED STATES PATENT OFFICE.

WILLIAM W. DOOLITTLE, OF CHICAGO, ILLINOIS, ASSIGNOR TO THE CRANE COMPANY, OF SAME PLACE.

ART OF MACHINING CASTINGS.

SPECIFICATION forming part of Letters Patent No. 587,477, dated August 3, 1897.

Application filed May 29, 1896. Serial No. 593,667. (No model.)

*To all whom it may concern:*

Be it known that I, WILLIAM W. DOOLITTLE, a citizen of the United States, residing in Chicago, Cook county, Illinois, have invented certain new and useful Improvements in the Art of Machining Castings, of which the following, taken in connection with the accompanying drawings, is a specification.

In the art of machining castings intended to have a smooth surface or surfaces it has been common heretofore to cast such surfaces flat or plain with sufficient extra metal upon the face or faces to be dressed or machined, so that when removed by a cutting-tool the finished casting will have the desired dimensions as well as the desired smooth face or faces.

Castings as commonly made have usually heretofore been machined either by the use of a single narrow cutting-tool traveling over the surface to be dressed by a fine feed either radially or transversely or by the use of two tools or sets of tools, one for roughing and the other for finishing. These two methods being both slow and expensive, it has been proposed to perform the machining operation by the use of a single broad tool forced directly against the face to be dressed without any material radial or transverse feed, the cutting edge being made to extend over sufficient surface to complete the operation in the shortest possible time. In the attempts to use this method serious trouble has been encountered because of the difficulty of getting the tool to cut readily under the hard brittle surface of scale formed on the casting as it comes from the sand, the riding of the edge of the tool along or upon such surface resulting in its rapid destruction.

The object of my invention is to overcome all of these difficulties, to reduce to a minimum the cost of machining castings, to increase the efficiency and capacity of the machines used in this art, and to greatly reduce the labor involved and at the same time prolong the life of the machinery employed by a new and useful method of preparing, treating, and finishing the castings, as will be hereinafter more fully described, reference being had to the accompanying drawings, illustrating means for carrying out my invention, in which—

Figure 5:
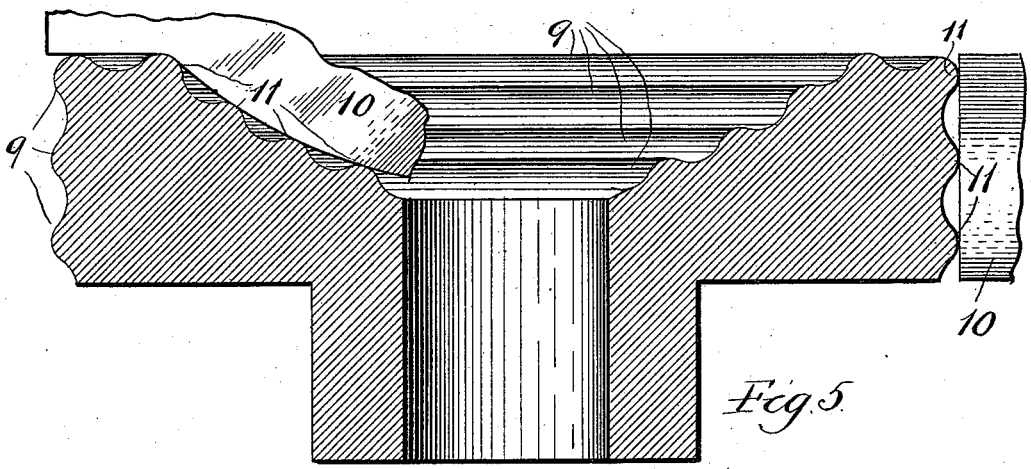
Figure 6:
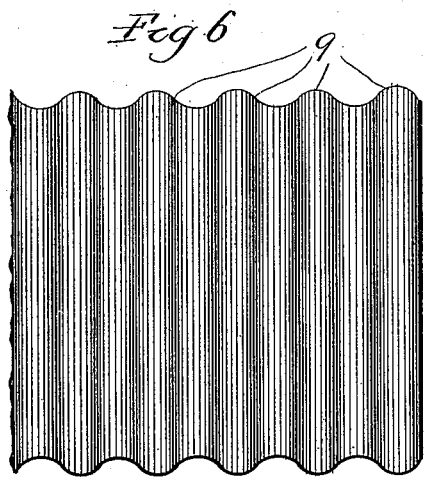
Figure 7:
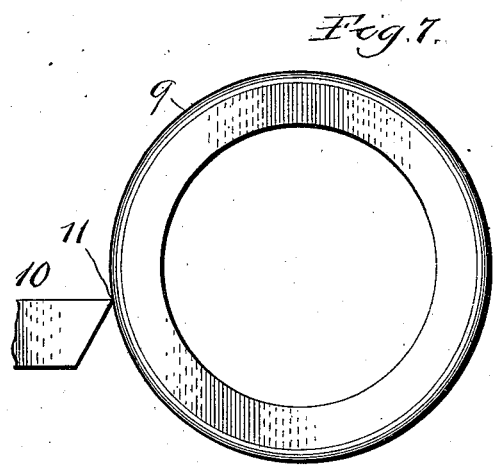
Figure 8:
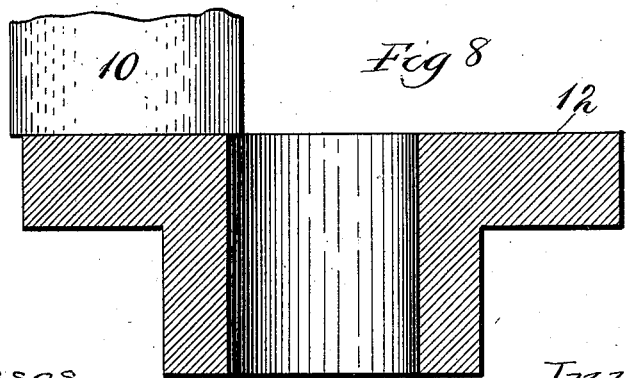

Figures 1, 2, 3, and 3ª are face views of a flange-fitting having corrugations or ribs thereon variously arranged. Fig. 4 is a section thereof taken on the line 4 4 of Fig. 3 and showing a tool in position against the face to be dressed. Fig. 5 illustrates a casting having both a flat cylindric and a concave face prepared according to my method. Figs. 6 and 7 show a cylindrical casting made in accordance with my invention. Fig. 8 represents a cast flange formed in the usual way with a single broad cutting-tool bearing thereon.

For a better understanding of my invention at the outset I will state that in Fig. 8 is illustrated the old way of preparing and dressing or finishing a flange-fitting. This old way, however, is not the way now commonly employed in the art of machining castings, for it has proven to my personal knowledge and in my personal experience to be unsatisfactory and commercially impracticable by reason of the expense involved.

In Fig. 8 the flange-fitting is provided with a plain surface 12 as it comes from the sand, this surface being the one that is intended to be dressed by the machine. It is obvious that if this hard scaly surface is attacked by the tool 10, as shown, throughout the length of its edge not only will the work be poorly done and the tool itself soon ruined by riding upon the surface of the scale, but it will also require an excessive power to operate the machine driving the tool.

By my invention I propose in making or preparing the casting or form to provide upon the face or faces of the casting or form corrugations, ribs, projections, or other similar irregularities which are abnormal to the finished or machined casting and afterward to remove these corrugations, ribs, projections, or irregularities by gradually cutting off the same, working directly from the apex to the base of the projection, and in practice I have found the most economical results to be attained by having a tool sufficiently broad to operate simultaneously upon a plurality of corrugations, ribs, projections, or irregularities, the tool being, by preference, of a length substantially equal to one-half the diameter of the flange, or, in other words and under other conditions, of a length exceeding the total width of the surface to be machined or dressed.

My invention, however, does not necessarily involve nor is it limited to the use of a cutting-tool of any particular kind or size or indeed to any cutting-tool at all, for my invention equally contemplates any other methods, such as abrading, by which the projections or irregularities on the face of the casting can be removed. Furthermore, it is obvious that my invention is not confined or limited to any particular arrangement, form, or character of corrugations, ribs, projections, or irregularities on the surface to be machined so long as the casting or form to be machined or dressed is provided with an irregular surface which enables a cutting or abrading tool to gradually cut into and remove the scaly outer surface from the casting by being brought into contact with but small portions thereof simultaneously instead of, as in the old art illustrated in Fig. 8, by direct engagement with the scale covering the whole surface to be machined.

Referring now more particularly to the drawings, in Fig. 1 the face of the casting to be machined is shown as provided with ribs or corrugations formed concentrically around the axis thereof. In Fig. 2 the ribs or corrugations are arranged spirally. In Fig. 3 they are transversely arranged in straight parallel lines. It is obvious that they might be arranged in any number of ways, and indeed in each particular casting it might seem desirable to adopt a particular method of arranging the corrugations or ribs.

In Fig. 4 a cutting-tool 10 is shown bearing against the ribs or corrugations 9 on the face of a flange-fitting, showing that the said tool, while extending from the inner to the outer periphery of said casting, can only attack the scale at certain points, as 11, along the length thereof until such ribs or corrugations are entirely cut away, it being obvious that the tool in doing such work cuts gradually into the ribs or corrugations directly from the apex or points to the bases thereof, thereby removing but a small portion of the scale at a time and enabling the cutting-tool to easily cut under and remove the scale without destruction or material dulling of the tool.

In Fig. 5 for the concave surface a finishing-tool with a curved edge is of course used, but with the arrangement of the corrugations as shown it is obvious that in this case also the tool has to attack the scale only in certain places at one time, as at 11. On a cylindric surface, as on the outside of the casting shown at Fig. 5 and on the outside of the casting shown in Figs. 6 and 7, the corrugations are preferably made diagonally across the surface or running in the direction of the travel of the tool. The latter arrangement is found in practice to be the preferable one for nearly all cases.

From years of practical experience in and knowledge of this art and from extensive practical use of my present invention I know that the cost of dressing castings by the best and only practical method now practiced by others is at least ten times as great as by my method, that great economy is secured by my invention in many particulars, such as in the saving of cost of resharpening the tools, the saving of time in changing the tools, lessening the wear and tear upon the machinery operating the tools, increasing the capacity of the machine and tools at least tenfold, and enabling the machining or dressing of ten times as many castings before resharpening of the tools is necessary as with any of the old methods now practiced.

Having thus fully described my invention, what I claim, and desire to secure by Letters Patent, is—

The method of machining or dressing castings which consists in casting the face to be dressed with corrugations, ribs or projections thereon, and then removing said ribs or projections by subjecting a plurality thereof to the action of a broad-edged cutting-tool acting from the top downward in a plane parallel with the face to be dressed, substantially as described.

WILLIAM W. DOOLITTLE.

Witnesses:
JOHN CONWAY,
ROBERT GANFORD.